United States Patent [19]

Bruel

[11] 4,204,390
[45] May 27, 1980

[54] HARVESTING MACHINE

[76] Inventor: Alain Bruel, Domain du Petit Chaumont, Aigues Mortes (Gard), France

[21] Appl. No.: 13,441

[22] Filed: Feb. 21, 1979

Related U.S. Application Data

[63] Continuation of Ser. No. 740,503, Nov. 10, 1976, abandoned.

[30] Foreign Application Priority Data

Nov. 10, 1975 [FR] France .................... 75 35103

[51] Int. Cl.² ............................................. A01G 19/00
[52] U.S. Cl. ..................................................... 56/330
[58] Field of Search ...................... 56/330, 331, 328 R, 56/13.5, 14.7

[56] References Cited

U.S. PATENT DOCUMENTS

| | | | |
|---|---|---|---|
| 3,203,159 | 8/1965 | Weygandt et al. | 56/330 X |
| 3,439,482 | 4/1969 | Orton | 56/330 |
| 3,590,566 | 7/1971 | Cutts, Sr. et al. | 56/330 |
| 3,727,388 | 4/1973 | Smith | 56/330 |
| 3,889,454 | 6/1975 | Bruel | 56/330 |
| 3,890,774 | 6/1975 | Bruel | 56/330 |

Primary Examiner—Russell R. Kinsey
Attorney, Agent, or Firm—Remy J. Van Ophem

[57] ABSTRACT

The invention relates to a harvesting machine. A harvesting machine is disclosed in which a tunnel defining member is supported on a mobile structure such that when the mobile structure is moved through the vineyard, the tunnel defining member passes over a row of vine stocks. Mounted within each tunnel defining member are a plurality of thresher members, or beaters, which have extending vertically spaced flexible bush engaging rods. These rods selectively engage the vines in a directed motion to harvest the fruit from the fruit bearing stocks. Means, in the form of a transversely oscillating flexible lateral deflecting lining, are used to direct the harvested fruit in a predetermined direction. Selective placement of the thresher members results in separation of said harvested crop according to the aging of the crop.

14 Claims, 12 Drawing Figures

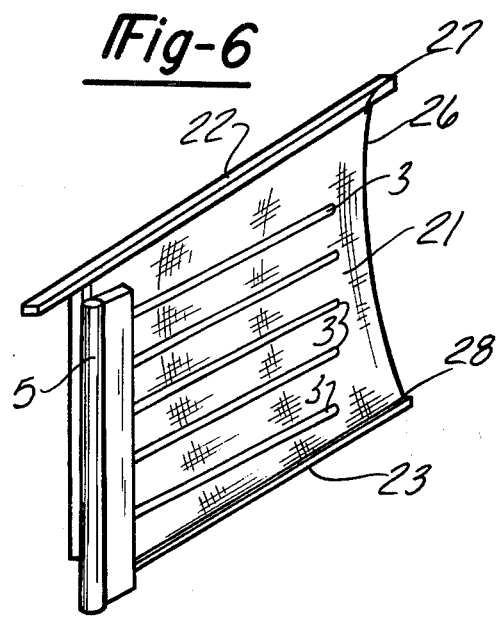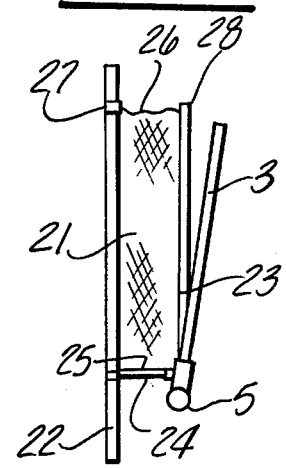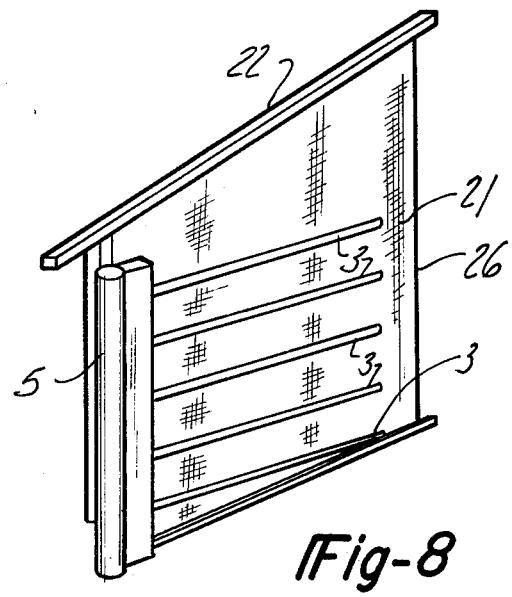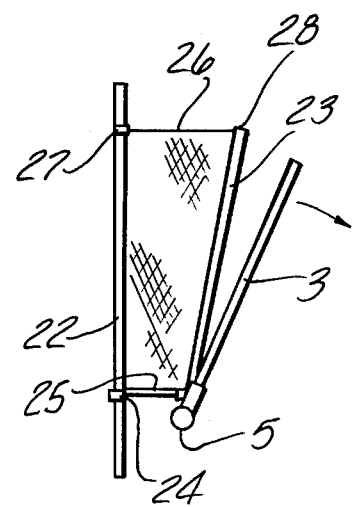

HARVESTING MACHINE

This is a continuation of application Ser. No. 740,503, filed Nov. 10, 1976, and now abandoned.

BACKGROUND OF THE INVENTION

1. Field of the Invention

The present invention relates to an agricultural machine for harvesting a vine and recovering and ejecting the collected fruit.

2. Description of the Prior Art

In known harvesting machines, the threshers are an assembly of beaters on a verticle shaft mounted on both sides of the line of the vine and activated by a transverse oscillating movement. The movement of these beaters is well known. Such systems are described in U.S. Pat. Nos. 3,889,454; 3,890,774 and 3,939,629 for: "A transverse beating device for a grape-gathering machine," all in the name of the present applicant.

For example, a grape recovering device for a grape gathering machine is characterized in that it includes at least one swinging frame in the shape of a downwardly open U, which is supported at its upper portion with the lower ends of the two arms adapted to be disposed on either side of a vine stock. The lower end of each arm has a substantially vertical pivot pin on which a lever pivots, the free end of said lever carrying in turn a pin on which a disk rotates freely, said sealing disk being slightly inclined with respect to the horizontal, and carrying peripheral notches intended to come and engage against the foot of a vine stock, while the notches of the other disk come and engage against the opposite side of said foot.

According to another feature, the two notched disks or scales of the swinging frame overlap each other in the same plane which is slightly inclined with respect to the horizontal, so that the grapes which fall on said scales discharge laterally by themselves, under their own weight.

According to another feature, the swinging frame is provided with a transmission gear between the two scale-carrying pivoting levers, so that, when one of the levers moves its scale, for instance, in the direction of the other arm of the swinging frame, the other lever moves its scale in the same direction, that is, the free section defined between the opposite notches of the two scales is kept substantially constant, said free section being used to allow the foot of a vine stock to pass. Owing to this arrangement, the stock is subjected to minimum stresses, so that the device does not injure the stocks.

According to another feature, the swinging frame is able to swing about the upper shaft or traveller from which it is hanging.

According to an additional feature, a plurality of swinging frames of the above-mentioned type are suspended behind on another from a single upper longitudinal shaft or traveller so that they define a tunnel or channel capable of topping a row of vines, while the swinging frames constituting said tunnel are able to swing independently from each other.

According to an additional feature, two travellers of the above-mentioned type are mounted on a single grape gathering machine, said travellers being directed lengthwise and side by side while each of them supports a tunnel provided with recovering disks or scales, so that said gathering machine can work on two rows of vine stocks simultaneously.

According to a further feature, each recovering scale is constituted by a disk of sheet steel coated with a material capable of withstanding continuous shocks and frictions, such as polyurethane, superpolyamide ("Nylon"), synthetic rubber, or the like.

According to a further feature, each scale is constituted by a steel disk having six notches, said notches being defined by the bottoms of six teeth, the shape of which is similar to that of a ratchet wheel, so that every disk presents a notch when a new vine stock is topped by the machine, and turns by itself as the machine moves forward with respect to said vine stock.

According to a further feature, said automatic rotary motion of the scales and the dip of the plane thereof with respect to the horizontal are used for ensuring the transfer of the vintage to the side of the tunnel or channel automatically.

According to a modification, each disk or scale has one of its surfaces provided with a rubber disk having a protruding lip, which improves the tightness and ensures a perfect recovery both of the grapes and the juice.

A beating device for a grape-gathering machine including at least one tunnel defining member in the shape of a downwardly open U, has two vertical arms which move on either side of a row of vine stocks. On each of the arms of the tunnel defining member at least one frame which is pivotally mounted about a vertical spindle parallel to the arm, each frame having flexible and resilient rods projecting from each end of said frame in the manner of the teeth of a comb. The rods are rearwardly directed with respect to the direction of movement of the machine, the assembly of rods mounted on one frame constituting a whip. Means are provided for controlling the swinging of the whip-carrying plates to bring the whips nearer to or farther from the center of the tunnel defining member. All the whips disposed on the same side of the row of vines are imparted movements identical with each other, said motions being out of phase with respect to the motions of the whips disposed on the other side of said tunnel defining member.

The movement of the whips is controlled by double-acting hydraulic jacks, each of which has a horizontal cylinder fixed to the machine, and a sliding rod extending from each end of said cylinder, one end of which is linked to one whip carrying frame, while the other end is linked to another whip carrying frame mounted on the same side of the tunnel.

Each whip carrying frame operates in opposite phase to the opposed whip carrying frame located in the same transverse section of the tunnel defining member; and in phase with the whip carrying frame or frames located in the same row, that is, on the same side of the tunnel defining member.

According to another feature, the whips located on the outer side of a row of vine stocks are imparted a motion which is out of step with respect to the swinging motion of the whips located on the inner side of the row, the amplitude of the motion of the outer whips being higher than the amplitude of the inner or whips. The link connecting one end of the jack rod to a frame carrying the first set of whips may be a greater length than that of the link mounted between a jack rod and a frame carrying a second set of whips, so that said difference in length of the links imparts to the first whips a swinging motion, the amplitude of which is greater than that of the synchronous motion of the second whips.

In all of these known machines, the vine is beaten alternately from one side and then the other. Even though the threshers are placed face-to-face they have different movements, and the crop is collected from both sides of the line of the vines. The recovery means, for example the notched discs described in U.S. Pat. No. 3,889,454 in the name of the present applicant insure vertical sealing of the machine. However, during threshing the grapes acquire a transverse motion and a certain part of the crop is lost on the side of the machine. There is no known system of recovery and ejection which permits, at the level of the machine, a primary selection of the must which would be particularly important for producing quality wines, and notably for the wines of "Appellation Controlee".

SUMMARY OF THE INVENTION

The present invention aims to avoid these disadvantages and to produce an improved grape harvester equipped with the means of ensuring sealing at the sides of the machine and pouring of the grapes onto an ejection system.

According to this invention, a grape harvesting machine comprises at least two threshers placed face-to-face providing two planes transversely threshing both sides of a line of vines, recovery means situated underneath the beaters of each thresher for collecting the grapes detached from the vine and at least one ejection system comprising a conveyor, characterised in that the oscillating vertical axis of the thresher located opposite the conveyor has in its lower section a horizontal bar situated between the recovery system and the thresher with which it oscillates, while a flexible lining has its lower end fixed on this bar, it upper end fixed on a rigid longitudinal part of the structure of the machine, the front vertical end of this lining being stretched under the action of a resilient means fixed between the rigid upper extremity and the lower extremity provided close to the axis of oscillation of the thresher, while the rear vertical end has its upper extremity fixed and its lower extremity free to oscillate transversely with the bar.

Preferably, the flexible lateral lining sweeps during the oscillation of the thresher a volume dependent on the two fixed edges that is to say the vertical edge stretched permanently and the upper horizontal end, the other two ends of the lining or canvas cover displacing each other transversely inside a space defined by the furthermost positions of the transverse oscillation of the thresher.

Preferably, also, the lower oscillating bar is fixed into one of its extremities on a plate which carries the vertical thresher while its opposite extremity if free and is directed towards the back and center of the machine while remaining situated in an external vertical plane to that defined by the beaters of the thresher.

The machine is, preferably, constituted by a tunnel of threshers comprising two threshers placed face-to-face, recovery means of the known type, for example the notched discs, a cover or deflecting lining whose transverse sweep pours all the grapes that have been picked into a conveyor, while this grape harvesting tunnel is mounted on the side of a structure which carries all of the driving mechanisms for the thresher, the carrying, the lifting, the separation and the ejection of the crop. This structure has in front a linkage to attach the machine to a tractor which travels between the two rows of vines and provides the motive power.

Preferably, the machine has a pair of threshers in front and a pair of threshers at the rear, each pair being consituted by two beaters placed face-to face on both sides of the line of vines, while a deflecting cover is activated with one of the threshers of each pair.

Alternatively, the forward cover and the rear cover are provided on the same side of the line of vines, so that all the crop is poured onto the same side, opposite the threshers carrying the covers.

Preferably, this recovery side is provided with an ejection system of the known type comprising a horizontal longitudinally extending conveyor, a lifting mechanism, and a means to separate the grapes from the twigs and leaves.

Preferably, also, a machine comprises on the same side of the harvesting tunnel, two conveyors circulating in opposite directions of each other. The forward conveyor collects the grapes detached by the first pair of threshers, while the rear conveyor collects the grapes detached after the second threshing by the pair of rear threshers. In this way one can have a selection of the crop. The ripest fruit detached during the first threshing is separated from the greener grapes by two distinct systems of ejection provided in the machine.

Preferably, the forward and rear covers are situated on both sides of the line of vines, while the machine comprises two longitudinal conveyors located on both sides of the harvesting tunnel, the selection of the crop can be further improved while cutting down on the defoliation of the vine, one can use for that one of the systems described in U.S. Pat. No. 3,939,629.

Of course, the deflecting cover or covers of the machine according to the invention can be adopted on all known types of harvesting machines with transverse threshing, whatever may be the kinetics of the threshers, the nature of the recovery systems and the ejection systems and the separation of the grapes.

BRIEF DESCRIPTION OF THE DRAWINGS

A preferred embodiment of this invention will now be described, by way of example only, with reference to the accompanying drawings of which:

FIG. 6 shows an enlarged view of a deflecting cover away from the line of vines;

FIG. 7 is a plan view corresponding to FIG. 6;

FIG. 8 shows the cover stretched, the corresponding thresher beating the vine;

FIG. 9 is a plan view corresponding to FIG. 8.

In order to orient the reader in the environment of the invention, the following description of a typical known grape harvesting apparatus is first given below with reference to FIGS. 1A and 1B.

Figure 1:
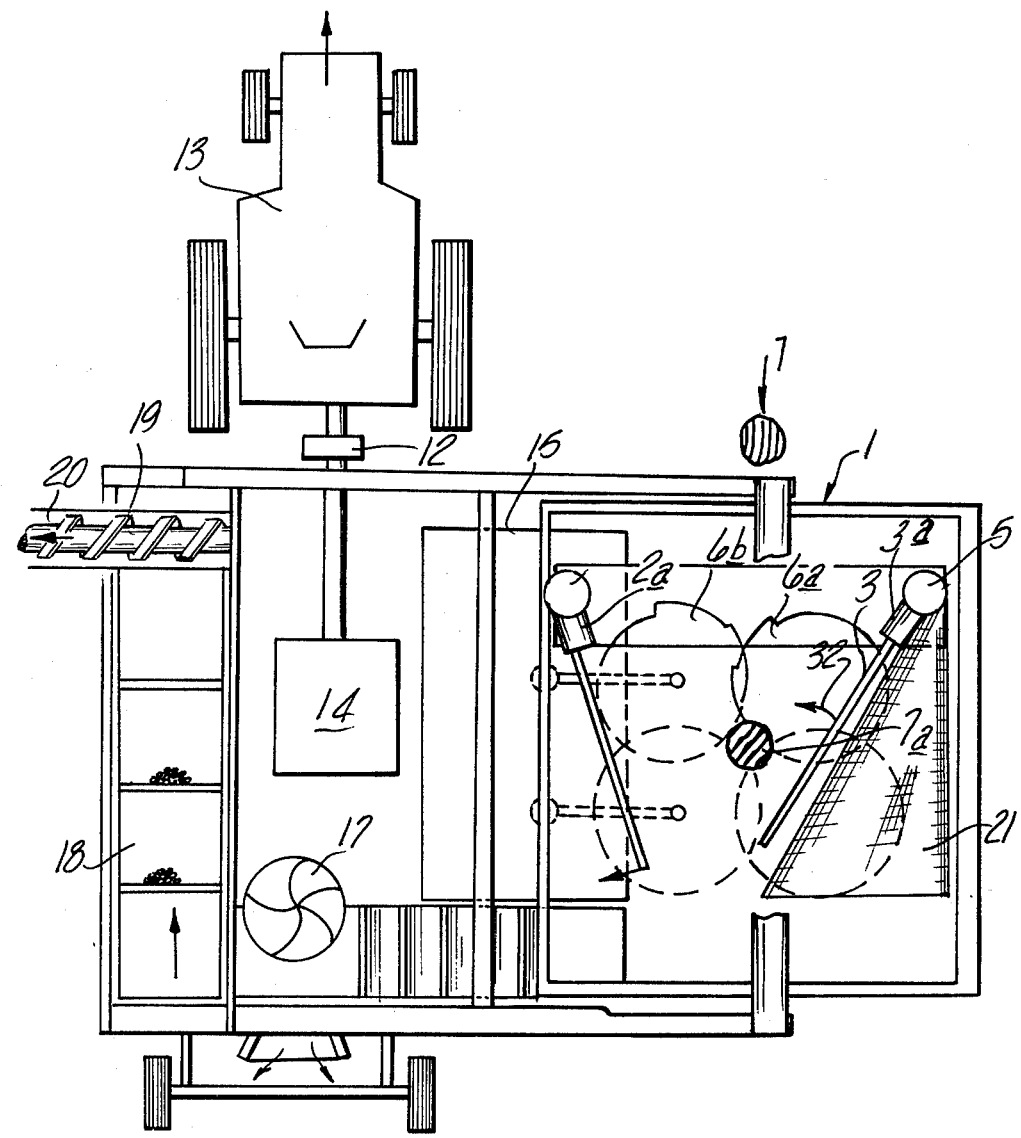
FIG. 1 is a plan view of the machine according to this invention.
Figure 1A:
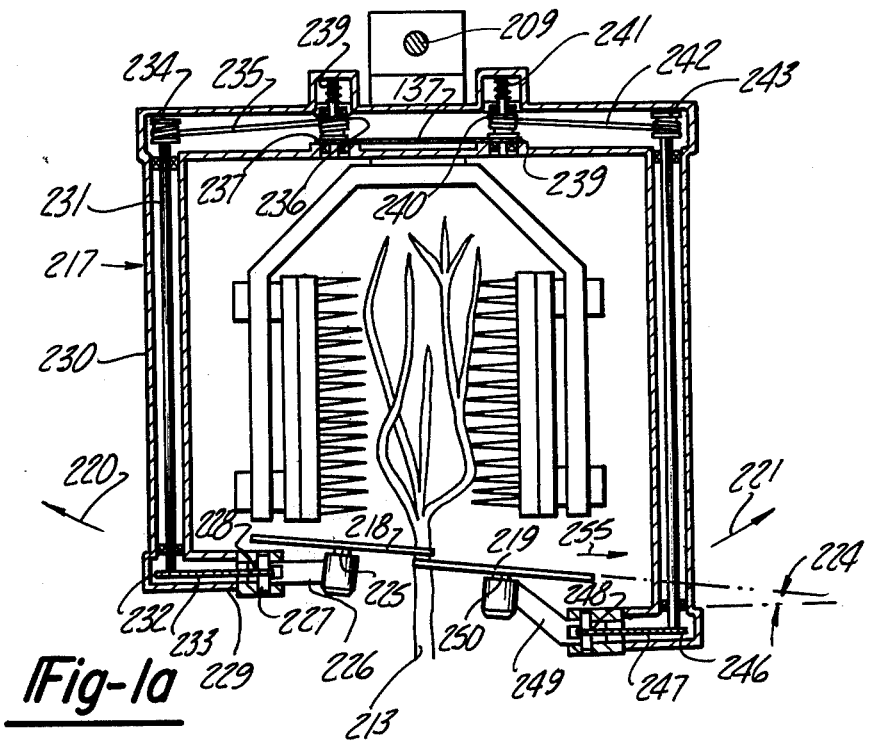
FIG. 1A shows the details of a recovery swing frame which is old in the art.

Each swinging frame 217 is able to swing freely with respect to the traveller 209 which carries it (FIG. 1A, arrows 221 and 220).

Each scale 218 or 219 is constituted by a disk, the periphery of which is cut out so as to define notches. The shape of said disk, as seen in plan view FIG. 1B, is similar to that of a ratchet wheel including six teeth 222. Each tooth takes up one sixth of the circumference. A notch 223 is defined at the bottom of each tooth (FIG. 1B). The disk is preferably made of sheet steel, and is covered with a sheath of flexible material (plastics material, synthetic rubber, or the like).

Each swinging frame 217 supports a scale 218 and a scale 219. These two scales overlap each other slightly (FIG. 1A) while remaining in the same plane, the latter being slightly inclined with respect to the horizontal. By way of example, the angle of inclination 224 (FIG. 1A) may be equal to 6°.

The scale 218 rotates freely about a pin 225 carried by a swinging lever 226. The opposite end of the latter is integral with a pin 227, which is substantially vertical, and on which a pinion 228 is keyed. The pin 227 rotates within a bracket 229 fitted to the lower end of the right-hand arm 230 of the swinging frame 217. A vertical shaft 231 is adapted to rotate inside said arm 230, and the lower end of said shaft is integral with a pinion 232 and connected to the above-mentioned pinion 228 by an endless chain 233.

The upper end of the shaft 231 carries a drum 234 onto which one of the ends of a cable 235 is wound. The other end of said cable winds on another drum 236, the vertical axle of which is connected:

to a pinion 237, on the one hand, to a braking and elastic return system 238 of the kind known as "tumber."

The pinion 237 is connected by an endless chain 137 to a further tumbler 239 provided on the drum 240 of a second tumbler 241. The latter is likewise connected by a cable 242 to a drum 243 provided on the upper end of a shaft 244 which rotates inside the vertical lefthand arm 245 of the swinging frame. The lower end of said shaft 244 carries a pinion 246 which is connected by an endless chain 247 to a pinion 248 integral with a swinging lever 249 which carries the pivot pin 250.

Thus, the two disks or scales and the levers thereof are elastically returned to a median rest position, but if one of them is shifted laterally, the other one follows it, and then they accompany each other during the return motion. In this way, the swinging frame is able to move forward along a row of vines, the stocks of which are not accurately aligned; the swinging motion of the levers makes it possible to keep the space under the stocks closed, while admitting a faulty alignment within a substantial range, such as, for instance, 40 centimeters.

Figure 1B:
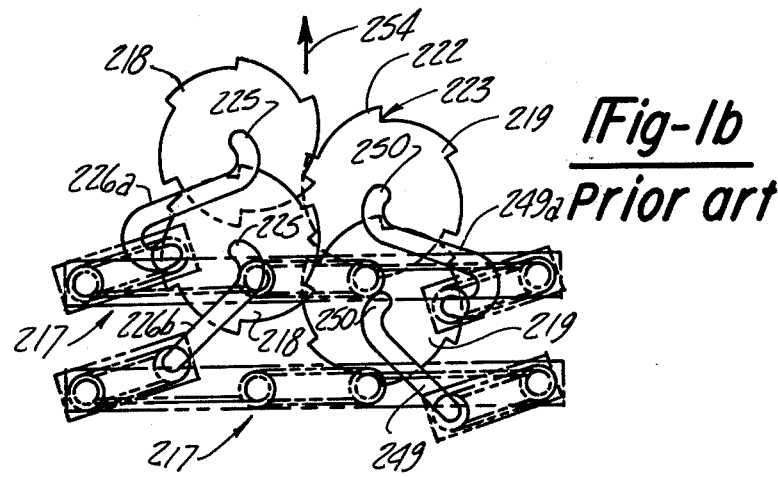
FIG. 1B indicates prior art structure that shows two pairs of scales at the time they attack a vine stock correctly aligned on the axis of the machine, and a vine stock laterally shifted, respectively.

According to another feature of the invention, the levers 226 are alternately given S-shapes 226a and F-shapes 226b (FIG. 1B), and the levers 249 are given similar shapes 249a and 249b, so that the pivots 225 and 250 for the rotation of the scales are staggered, as viewed when looking at the machine from top to bottom (FIG. 1B).

Owing to said arrangement, it will be noted too that two adjacent scales 218 not only overlap each other, but still overlap the scales of the next row 219.

Figure 1C:
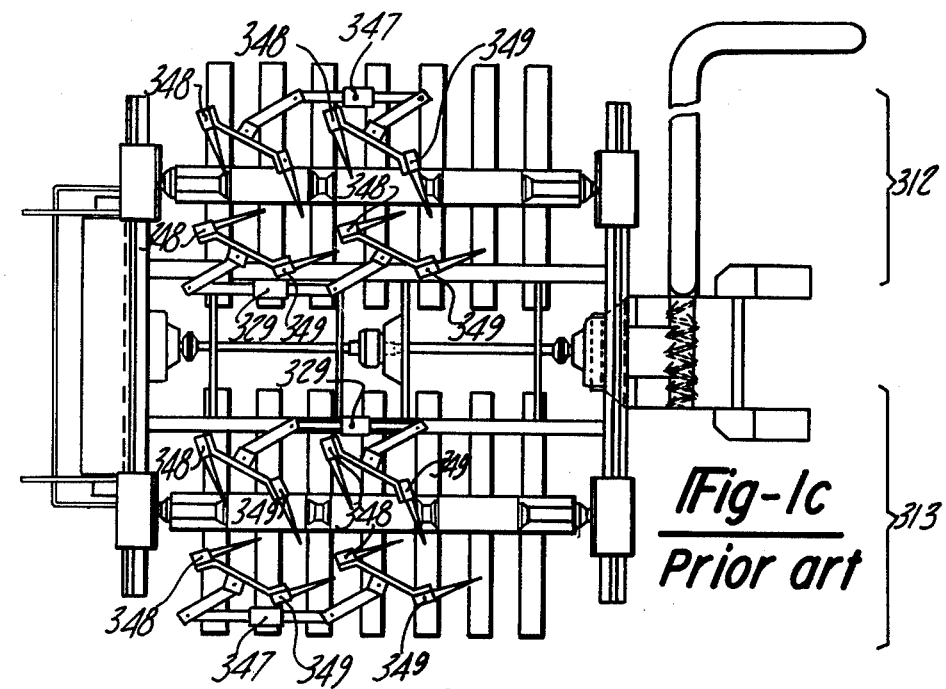
FIGS. 1C and 1D are plan views of prior art structure showing the disposition of the beating members operating in opposition of phase.
Figure 1D:
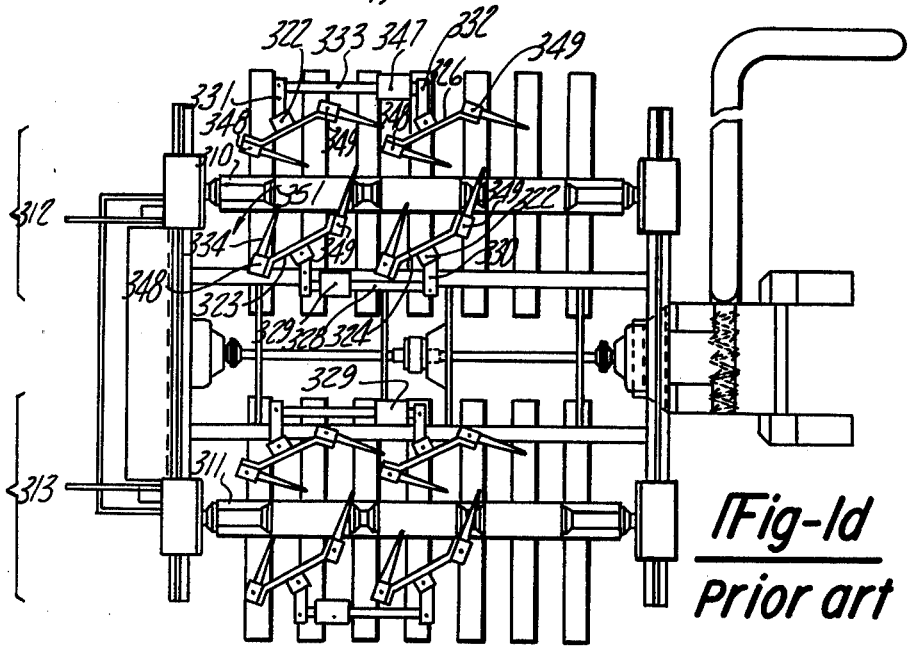

The following description of a typical known device is also given with reference to FIGS. 1C and 1D in order to further orient the reader with respect to operation of the harvester.

According to a first embodiment, as shown in FIGS. 1C and 1D, a frame 323 is rigidly attached to an arm 327 which is pivotally connected to one end of rod 328 of a hydraulic jack, the cylinder 329 of which is fixedly mounted to one wall of tunnel defining member. Said rod 328 projects on either side of the cylinder 329, while its opposite end is linked to the arm 330 of the frame 324. Frame 324 is likewise attached to arm 330 which is pivotally attached to the other end of the rod 328.

The arm 331, the frame 325 and the arm 332, the frame 326 are likewise connected to each other and to the two ends of the sliding rod 333 of a jack, the cylinder of which 347 is fixed to the opposed wall of the tunnel defining member.

Each of frames 323, 324, 325, and 326 is attached at its ends, to two vertical plates 348 and 349, each of which carries a whip constituted by a plurality of flexible horizontal rods 334. The rods 334 on a given plate, such as 348, are disposed in the manner of the teeth of a comb of which said plate would be the back. The frames 323, 324, 325, and 326 are pivotally attached to spindles 322 which are, in turn, attached to the tunnel defining member.

Each rod 334 has preferably an oval or elongated cross section. Thus, by varying the orientation of the larger diameter of the oval of each rod 334 at the time it is being mounted in its supporting plate, such as 348, the characteristics of flexibility of said rod are modified in the transverse direction.

The two plates 348 and 349 are obliquely fixed onto the ends of frames 323, 324, 325, and 326 as shown in FIGS. 1C and 1D. Thus, the rods 334 of the plate 348 come to hit the vine from the rear forward (arrow 351) during the forward stroke of the jack 328-329 (FIG. 1D), while the rods 334 of the plate 349 hit the vine from the front rearward (arrow 352) during the return stroke of said jack 328-329. Owing to this motion, the ends of the rods 334 of the plates 348 and 349 on either side of tunnel defining member 17 describe paths which overlap each other and are adapted to cross each other behind an obstacle, while removing the blind angles. This makes it possible, for instance, to detach a cluster of grapes hidden behind a branch and leaves, which ensures collecting 90 percent, or even more, of the vintage, whatever may be the type of stocks and the capacity of the clusters for being detached.

Each jack 328–329 or 347–333 is a double-acting hydraulic jack. The circuitry utilized to control the jack is not shown since such is well known in the art. The actuations of rods 328 and 333 are adjusted in opposite phase, that, when the rod 328 and, consequently, frames 323 and 324 and whips 334 reach the end of their hitting stroke on the right-hand side of the tunnel 312 (FIG. 1D), the rod 333 and, consequently, the frames 325 and 326, and whips 334 are reaching the end of their return stroke, and conversely. Thus, the two plates 348 disposed opposite each other on two sides of a tunnel 312 and 313 are always in opposite phase. The same applies to the pairs of oppositely disposed plates 349.

DESCRIPTION OF THE PREFERRED EMBODIMENT

Figure 2:
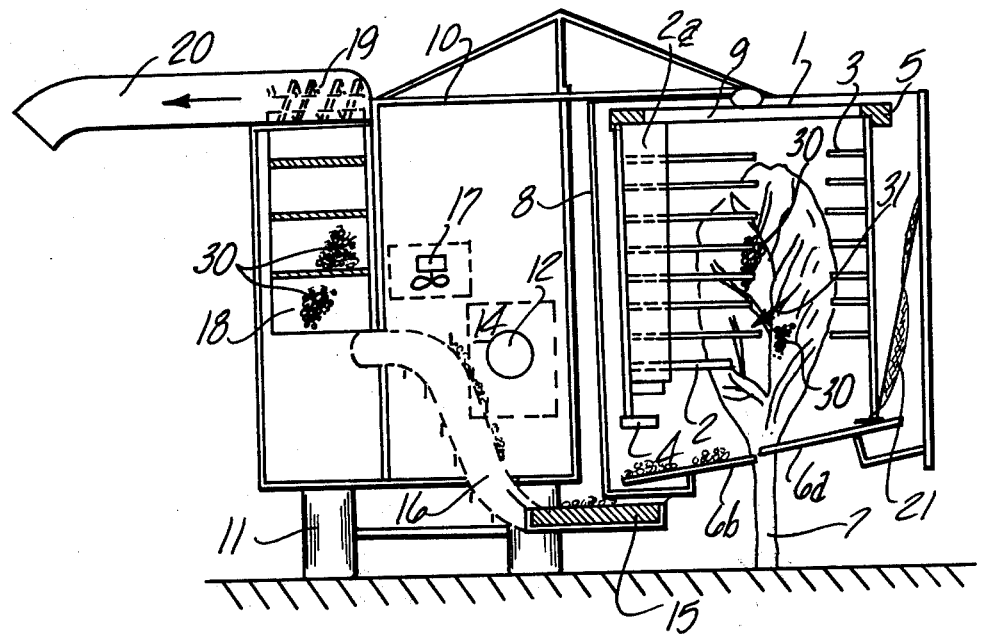
FIG. 2 is a front view.
Figure 3:
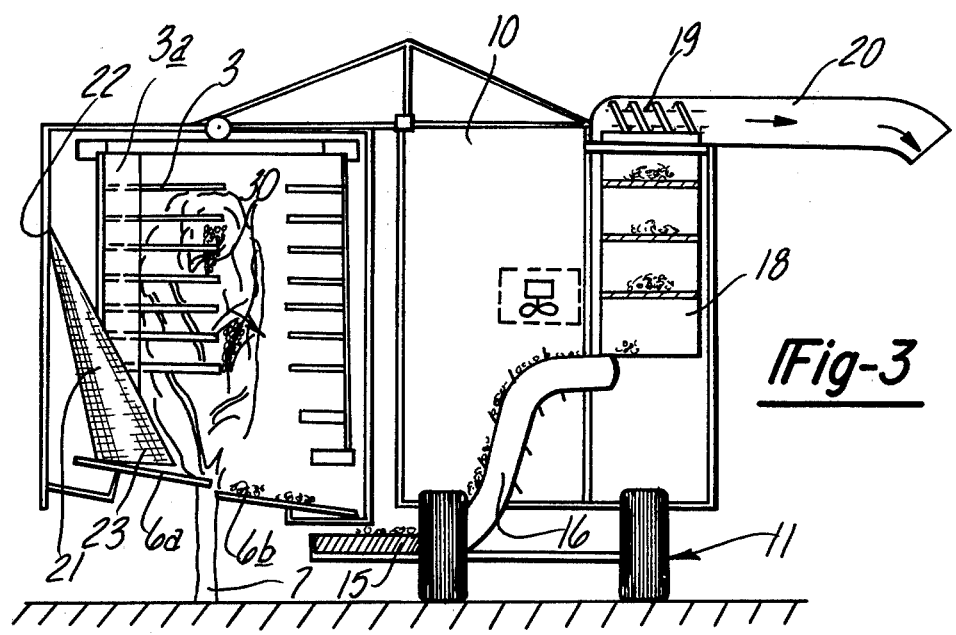
FIG. 3 is a rear view.

Referring to FIGS. 1, 2 and 3, there is shown a harvesting machine having a plant passageway or tunnel 1 and which mounts two threshers 2 and 3 located face-to-face that are activated for transverse oscillating movement around vertical shafts 4 and 5. At the base of this tunnel, recovery or catching means, for example, toothed plates 6a, 6b are supported on the machine to collect the grapes detached from the vine 7 as a result of the kinetic energy transmitted by the threshers 2 and 3. As is known, plates 6a, 6b and the threshers 2 and 3 can be mounted on oscillating arms 8 and 9 to avoid too great a defoliation of the vine such that a vine plant 7a will not be stripped laterally.

The structure that defines a tunnel is located on one side of the chassis 10 which is provided at the rear with a rotating wheel assembly 11 and at the front with a coupling mechanism 12.

This coupling 12 allows the attachment of the machine to an agricultural tractor 13 and provides a source of power 14 as a result of which all the systems of the machine can be driven.

Besides the threshers and the plates located on both sides of the line of vines, the machine comprises:

at least one horizontal longitudinal conveyor 15 that deposits the crop onto an oblique carrier 16, a system 17 for separating the grapes from the leaves, it could be for example, a suction tube sending the leaves towards the rear of the machine;

a bucket conveyor 18 which deposits the grapes onto a lateral Archimedian screw 19 which is connected with a delivery channel 20.

These systems given by way of examples are carried by the chassis members 10. These recovery and ejection systems are known. They will not be described in detail in the present description (FIGS. 1, 2 and 3).

The threshers 2 and 3 consists of vertical shafts 4 and 5 to which is mounted a plurality of horizontal tines. The tines are carried by plates 2a and 3a which in turn are connected to members 4 and 5. These tines or beaters transmit to the vine a transverse acceleration. It has been stated that it is important to locate on the side opposite the conveyor 15, a recovery system facing the lateral projection of the grapes which have been detached.

This system is for example constituted by a cover 21 shown in detail in FIGS. 6 and 7 fixed in the following manner:

the upper end of the cover is fixed to a member 22 fixed to the chassis 1 forming a tunnel while the lower end is connected to a beater or to a horizontal oscillating bar 23. This bar 23 is carried by the plate 3a carrying the beater 3 and located directly above the toothed plates 6a, 6b. One end of this bar 23 is directed towards the center of the tunnel 1 while remaining to one side of it because of the thresher 3. Finally this special beater 23 is longer than the beaters of the thresher 3.

The cover is attached to the oscillating bar at a point situated near the axis of the oscillating thresher and to at least one other point situated near the free rear end of the bar 23. A resilient means 24 is located between the two upper and lower extremities of the side in front of the cover 21. This front edge 25 remains constantly under tension. However, the rear edge 26 of the flexible cover 21 is fixed between an upper fixed point 27 and a free point 28 with the oscillating bar 23. Therefore where the spacing between the two points 27 and 28 is minimal, the contour of the edge 26 is not rectilinear but determined by the weight of the cover (FIGS. 7 and 8). However, when the thresher 3 approaches the center of the line of vines, the bar 23 including the fixed point 27 follow the same movement. The distance between the points 27 and 28 increases, the rear edge of the cover stretches, as shown in FIGS. 8 and 9. Between these two extreme positions, the cover or deflecting mechanism 21 is activated by a movement of transverse oscillation with the thresher to which it is attached.

OPERATION

The operation is as follows. When the thresher 3 and the cover 21 are spaced, the vine 7 is shaken by the opposing beater 2 whose kinetic energy is received by the bunches of grapes which are detached. These bunches 30 are then shaken laterally as they descend following the arrow 31 (FIG. 2). The bunches are collected either by the toothed plates of the series 6a, 6b on the right hand side in FIG. 2 or by the deflecting cover 21.

When the movement of oscillation reverses, the thresher 2 moves away from the line of the vine while the thresher 3 penetrates it and moves the cover 21 therewith. The beaters of the thresher penetrate into the vine plant, while the cover 21 sweeps the grapes which have remained on the toothed plates 6b toward the plates 6a and the conveyor 15 (arrow 32, FIGS. 1 and 3). Simultaneously, the bunches detached by the thresher 3 fall following the arrow 33 shown in FIG. 3.

All the crop is recovered in this way on the conveyor 15 which directs it in known manner towards the lifting system, separators, and ejection systems. For example, a first conveyor 16 takes the crop to the level of a pneumatic separator 17 which expels the leaves towards the rear of the machine by a hopper 34, while the heavier grapes are moved onto a bucket conveyor 18 then onto a Archimedian screw 19. This screw redirects the grapes into a lateral delivery channel 20 (FIGS. 1 and 3).

Figure 4:
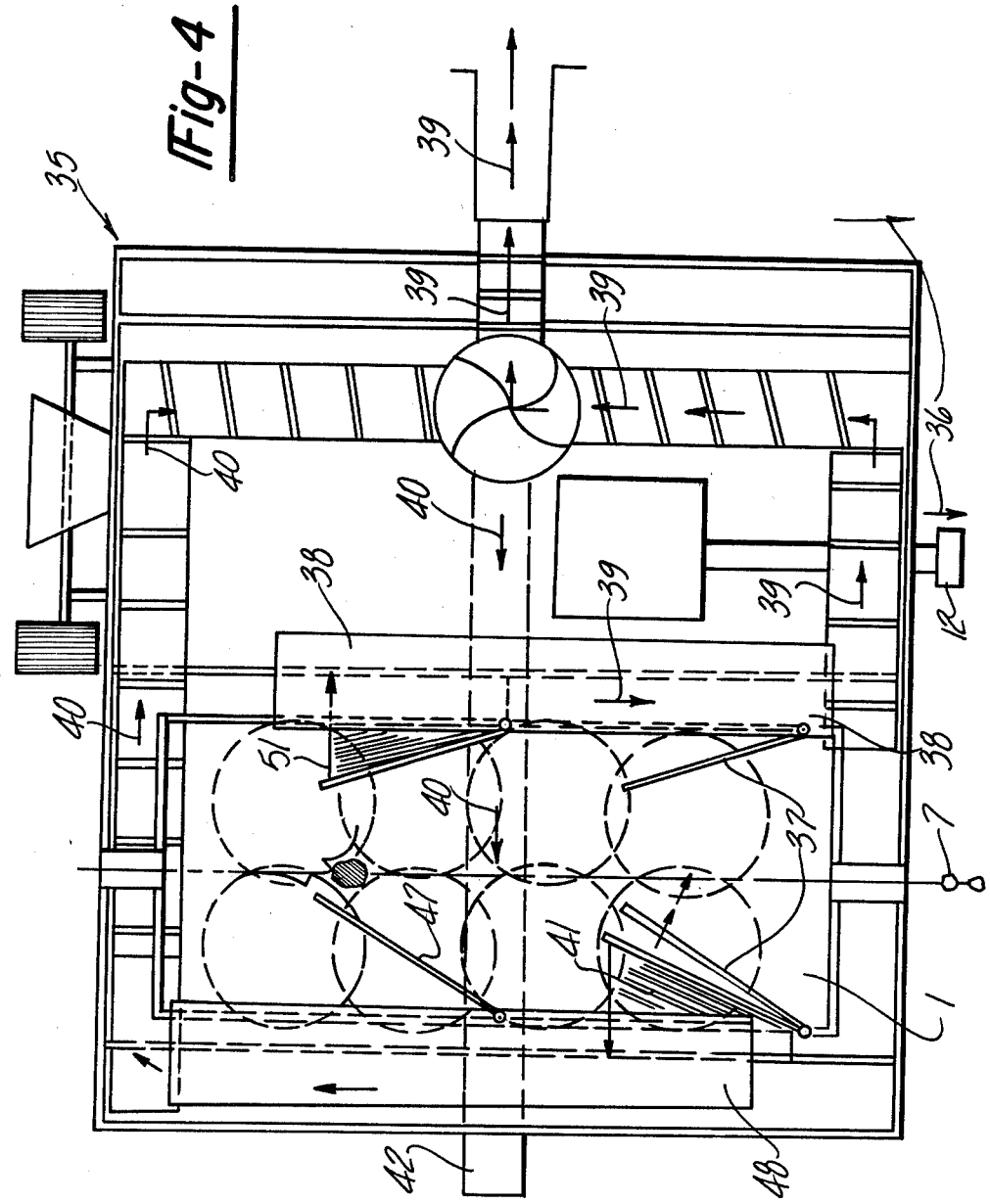
FIG. 4 is a cross-section of a first modification with two pairs of threshers and two conveyors placed on each side of the central plane of the thresher.

One can see therefore that during the threshing the lateral deflecting wall 21 is submitted to a transverse oscillation synchronised with the oscillation of the threshers 3. The position and location of the deflecting wall 21 permit all the crop to be thrown again onto the one conveyor 15 located on the other side of the line of vines because of the alignment of the vines. This particular feature allows picking of a selection of the crop as it rises along the harvesting tunnel and leaves two pairs of threshers placed face-to-face. An alternate embodiment of the present invention is illustrated in FIG. 4.

The machine 35 is connected to a tractor (not shown) and travels in the direction of the arrow 36. The threshers at the front 37 detach the ripest grapes. The deflecting lining 41 is situated on the left, the grapes are collected on the central conveyor 38 whose upper run moves forward. The crop from the first threshing is transported, lifted and ejected following the path indicated by the arrows 39 in FIG. 4.

At the level of the rear threshers 47, the vine is subjected to a second threshing which detaches greener grapes. The deflecting lining 51 is connected at the lower level of threshing. Its oscillation redirects this second crop of greener grapes longitudinal conveyor 48 whose upper run moves for example from front to rear. This second crop is directed by a second transporting and lifting system in the direction of the arrows 40 and ejected laterally through a channel 42 (FIG. 4).

Figure 5:
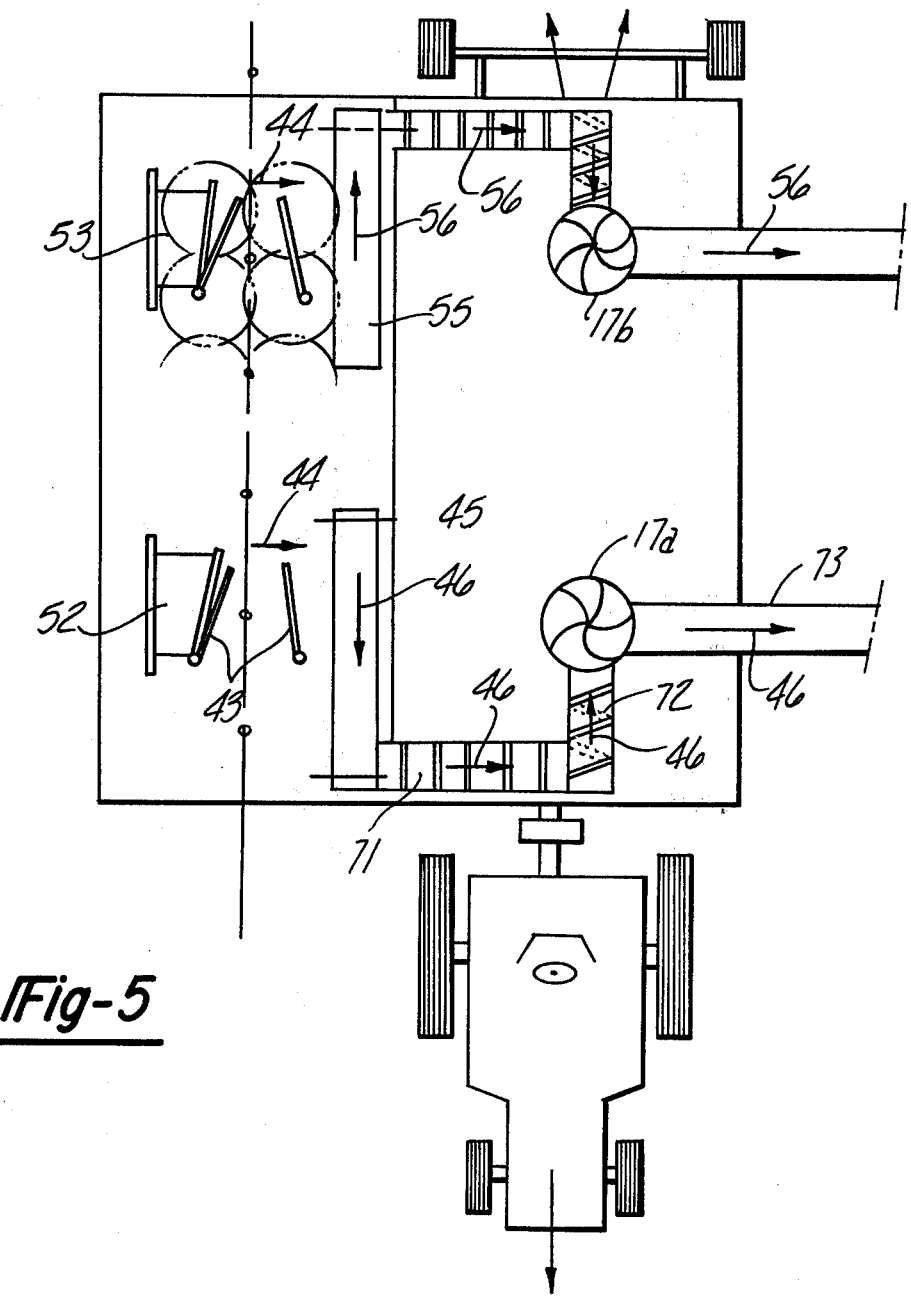
FIG. 5 is a schematic view of a second modification to thresh selectively, equipped with conveyors located on the same side.

FIG. 5 shows a further modification of the machine for selective harvesting. The deflecting linings in front 52 and at the rear 53 are connected to the thresher situated on the same side of the vine. With each pair of threshers there is associated a conveyor located between the chassis 10 and the threshing tunnel. The ripest grapes are collected from the first threshing by the front system 43 and they are redirected in the direction of the arrow 44 onto the conveyor 45 having a top run moving from rear to front. The ripest grapes then follow a path illustrated by the arrows 46 along a horizontal conveyor 45, up obliquie carrier 71, back along horizontal carrier 72 past pneumatic separater 17a, and out conveyor 73. After that, the grapes are ejected for example into a first trailer of a convoy moving parallel to the machine between the two rows of vines. The grapes are transferred from one conveyor to another in any known manner such as is shown for the embodiments of FIGS. 1–5. The second motion of the threshers 54 placed face-to-face detaches the greener fruit which is not detached by the first threshing. These fruits are collected on the conveyor 55 rotating from front to rear. This second picking follows a similar path but separate from the path of the first crop. This path is for example shown by the arrows 56 and the grapes are poured into the second trailer of the convoy (not shown) mentioned before in the same manner that the riper grapes are moved, as described above.

The drawings do not illustrate in any great detail the transporting mechanisms, the lifting systems, the separators and the ejection systems which are well known in the art.

One would not depart from the scope of the invention by modifications in the details of the operation of the system or even the structure of the machine. In effect, the principle advantages of this invention are as follows:

all the crop produced from a pair of threshers is collected on a single conveyor-transporter;

several pairs of threshers placed face-to-face are mounted along the harvesting tunnel permitting the immediate selection of the grapes harvested;

a deflecting lining can easily be adapted for all types of harvesting machines using transverse oscillation of beaters.

While the preferred embodiment of the invention has been disclosed, it will be apparent to those skilled in the art that changes may be made to the invention as set forth in the claims and, in some instances, certain features of the invention may be used without corresponding use of other features. Accordingly, it is intended that the illustrative and descriptive material herein be used to illustrate the principles of the invention and not to limit the scope thereof.

I claim:

1. A mobile crop harvesting machine having drive means and comprising:
    a driven mobile chassis;
    a frame structure mounted on said chassis, said frame structure having one end portion defining a tunnel member in the shape of a downwardly open "U" and an opposite end portion defining a housing;
    at least one oscillating arm member connected to said drive means and mounted to said tunnel member, said at least one oscillating arm member further comprising:
        at least two substantially vertical thresher members mounted to said oscillating arm member;
        a plurality of beaters mounted to said substantially vertical thresher members for movement therewith;
        a first means for recovering a crop, said recovery means having one end attached to said tunnel member and an opposite end attached to one of said beater members;
        a second means for recovering said crop mounted on the lower end of said housing and in spaced relationship to said first recovery means, said second recovery means communicating with said first recovery means, said second recovery means further comprising:
            a means for processing said crop mounted on and within said housing, said processing means communicating with said second recovery means, said processing means further having means for selectively separating the harvested crop according to the aging of said crop.

2. A harvesting machine according to claim 1 wherein said at least two substantially vertical thresher members further comprise:
    oscillating means interposed said thresher members and said arm member, said oscillating means communicating with said vertical thresher members whereby said vertical thresher members adopt a transverse oscillating movement around a vertical axis.

3. A harvesting machine according to claim 2 wherein said transverse oscillating motion of one of said at least two substantially vertical thresher members is synchronized with said transverse oscillating motion of said other of said at least two substantially vertical thresher members.

4. A harvesting machine according to claim 1 wherein said at least two substantially vertical thresher members are located in a face-to-face relationship.

5. The harvesting machine according to claim 1 wherein said at least two substantially vertical thresher members are located on either side of said harvested crop in a non face-to-face relationship.

6. The harvesting machine according to claim 1 wherein one of said two substantially vertical thresher members further comprises:
    a substantially horizontal bar member mounted to one of said substantially vertical thresher members interposed said second recovery means and said plurality of beater members;
    means for attaching one end of said first recovery means to said substantially horizontal bar, said attaching means permitting said rear edge of said first recovery means to move freely with said substantially horizontal bar;
    means for oscillating said substantially horizontal bar member; and
    means for mounting said substantially horizontal bar member to one of said thresher members for movement therewith.

7. The harvesting machine according to claim 1 wherein said first recovery means further comprises:
    a resilient lining having one end attached to said tunnel member and an opposite end attached to one of said beater members; and
    a front substantially vertical edge being under tension under the action of a resilient means fixed between said one end of said lining and said opposite end, said lining further having a rear substantially vertical edge having its upper extremity fixed to said tunnel member and its lower extremity attached to one of said beater members.

8. The harvesting machine according to claim 1 wherein said first recovery means further compises:
   a resilient lining having one end attached to said tunnel member and an opposite end attached to said substantially horizontal bar member; and
   a front substantially vertical edge being under tension under the action of a resilient means fixed between said one end of said lining and said opposite end, said lining further having a rear substantially vertical edge having its upper extremity fixed to said tunnel member and its lower extremity attached to said substantially horizontal bar member.

9. The harvesting machine according to claim 7 wherein said resilient lining sweeps a volume defined by said front substantially vertical edge, said one end of said lining attached to said tunnel member, said opposite end attached to said one of said beater members and said rear edge during the oscillation of said one of said thresher members.

10. The harvesting machine according to claim 7 wherein said resilient lining sweeps a volume defined by said front substantially vertical edge, said one end of said lining attached to said tunnel member, said opposite end attached to said substantially vertical bar member and said rear edge during the oscillation of said one of said thresher members.

11. The harvesting machine according to claim 6 wherein said substantially horizontal bar member has one of its extremities fixed on a vertical plate carrying said one of said beater members and an opposite extremity directed toward the rear and the center of said machine free to rotate along a vertical plane to that defined by said plurality of beater members mounted to said thresher member.

12. A harvesting machine according to claim 1 wherein said first recovery means is arranged to collect all of said harvested crop toward one side of said downwardly open "U" shaped tunnel member.

13. A harvesting machine according to claim 1 wherein said processing means further includes conveyor means for selectively separating said harvested crop according to the aging of said crop.

14. A harvesting machine according to claim 1 wherein said first recovery means selectively directs said crop to either side of said downwardly "U" shaped tunnel member according to the aging of said crop.

* * * * *

UNITED STATES PATENT AND TRADEMARK OFFICE
CERTIFICATE OF CORRECTION

PATENT NO. : 4,204,390
DATED : May 27, 1980
INVENTOR(S) : Alain Bruel

It is certified that error appears in the above-identified patent and that said Letters Patent are hereby corrected as shown below:

Column 1, line 59 delete the word "on" and insert ----one----.

Column 6, line 67 delete the word "and" and insert ----or----.

Column 7, line 17 after the word "structure" insert the numeral ----1----.

Column 8, line 66 after the word "grapes" insert ----onto the----.

Signed and Sealed this

Seventh Day of October 1980

[SEAL]

Attest:

SIDNEY A. DIAMOND

Attesting Officer

Commissioner of Patents and Trademarks